United States Patent
Bryar et al.

(10) Patent No.: US 7,831,439 B1
(45) Date of Patent: Nov. 9, 2010

(54) SYSTEM AND METHOD FOR CONVERTING GIFTS

(75) Inventors: Colin M. Bryar, Seattle, WA (US); Jeffrey P. Bezos, Greater Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1028 days.

(21) Appl. No.: 11/370,772

(22) Filed: Mar. 8, 2006

(51) Int. Cl.
*G06Q 99/00* (2006.01)

(52) U.S. Cl. .......................... 705/1.1; 705/14; 705/26; 705/27; 705/37; 235/381

(58) Field of Classification Search ............... 705/1, 705/14, 26–27, 37, 1.1; 235/472.02, 381
See application file for complete search history.

(56) References Cited

U.S. PATENT DOCUMENTS

| | | | |
|---|---|---|---|
| 6,321,211 B1 * | 11/2001 | Dodd | 705/26 |
| 6,519,573 B1 * | 2/2003 | Shade et al. | 705/26 |
| 6,609,106 B1 * | 8/2003 | Robertson | 705/26 |
| 6,837,436 B2 * | 1/2005 | Swartz et al. | 235/472.02 |
| 7,013,292 B1 * | 3/2006 | Hsu et al. | 705/37 |
| 7,174,307 B2 * | 2/2007 | Sakai et al. | 705/26 |
| 2003/0149637 A1 * | 8/2003 | Yamada et al. | 705/26 |
| 2004/0064374 A1 * | 4/2004 | Cho | 705/26 |
| 2006/0069627 A1 * | 3/2006 | Petersen et al. | 705/27 |
| 2007/0203788 A1 * | 8/2007 | Andalib et al. | 705/14 |

FOREIGN PATENT DOCUMENTS

| | | |
|---|---|---|
| WO | WO 0116786 A1 * | 3/2001 |
| WO | WO 0180159 A1 * | 10/2001 |

OTHER PUBLICATIONS

Shedden, Juliet, "Thanks for the Gift, Now How Do I Get What I Really Want?", Jan. 10, 2004, The Guardian, 4 pgs.*
Sherry, Jr. et al. ; "The Disposition of the Gift and Many Unhappy Returns", Spring 1992, Journal of Retailing, vol. 68, No. 1, pp. 40-65 (26 pgs).*

* cited by examiner

*Primary Examiner*—John W Hayes
*Assistant Examiner*—Freda A Nelson
(74) *Attorney, Agent, or Firm*—Knobbe, Martens, Olson & Bear LLP

(57) ABSTRACT

A computer-implemented data processing system comprises a user interface and gift conversion logic. The user interface is configured to permit users to order products using a network service, such as a website. The gift conversion logic is in communication with the user interface and permits the users to specify gift conversion rules. For each user that specifies gift conversion rules, the gift conversion rules define a manner in which gifts purchased for the user by other users may be converted.

72 Claims, 12 Drawing Sheets

What to do:
:
:

426 — When to convert: | After checking with me ▽ |

480 — After checking with me...
481 — After notifying me, and if I have not responded in ___ days...
482 — Immediately, without checking with me
483 — More options...

FIG. 4F

What to do:
:
:

428 — Messaging to sender: | No ▽ |

490 — None
491 — Yes, and send a thank you note...
492 — Yes, and give the sender the option to change gift...
493 — More options...

FIG. 4G

| | | Conditions for Triggering Gift Conversion (Empty field indicates default values, e.g., "none.") | | | Action (Empty field indicates default values, e.g., "convert to GC.") |
|---|---|---|---|---|---|
| | User-Assigned Name/Description | Sender Condition | Product Condition | Gift Timing Condition | |
| 501 | "Convert all gifts from Aunt Mildred" | Sender ID = 12345 ("Aunt Mildred") | | | |
| 502 | "Not another XYZ comic strip calendar" | | Product ID = 23456 (XYZ comic strip calendar) | | |
| 503 | "Check clothes sizes first" | | Product Category = Apparel | | Convert size; Notify me and give limited details |
| 504 | "No Clothes with wool" | | Product Category = Apparel; Product Feature = Wool | | |
| 505 | "Convert VHS to DVDs" | | Product Category = Movies; Product Feature = DVD | | Convert format |
| 506 | "Stop at 35 math books" | | Product ID = 56789 (math textbook); Product Quantity = 100 | | |
| 507 | "Stop at 100 hats" | | Product Category = Children's hats; Product Quantity = 100 | | |
| 508 | "Stop at 100 mittens" | | Product Category = Children's mittens Product Quantity = 100 | | |
| 509 | $50 individual limit | | Indv'l Dollar Value > $50 | | |
| 510 | $500 aggregate limit | | Aggregate Dollar Value > $500 | | |
| 511 | "Around my birthday" | | | Timing = MM1-DD1-YY1 to MM2-DD2-YY2 | Convert to other gift |
| 512 | "For the next two months" | | | Timing = MM-DD-YY to MM-DD-YY+2 mos | |

SYSTEM AND METHOD FOR CONVERTING GIFTS

BACKGROUND

With the increasing popularity of network shopping services (e.g., websites that enable users to make purchases on-line), the popularity of purchasing gifts through network shopping services has also increased. As in other gift-giving situations, it sometimes occurs that gifts purchased on-line do not meet the needs or tastes of the gift recipient. For example, the recipient may already have the item and may not need another one of that same item. Alternatively, the item may not be the right size, the right type, the right style, and so on. In such situations, the recipient may wish to convert the gift to something else, for example, by exchanging the gift for another item or by obtaining a redemption coupon, gift card, or other gift certificate to be redeemed later.

In some cases, concern that the gift recipient may not like a particular gift may cause the person sending the gift to be more cautious in gift selection. The person sending the gift may be less likely to take a chance on a gift that is unexpected but that the recipient might truly enjoy, opting instead for a gift that is somewhat more predictable but less likely to be converted to something else. If the sender does decide to send the more unexpected gift, the sender may offer words of encouragement to the recipient (e.g., instructing the recipient to "feel free to exchange it if you don't like it"). However, the process of converting the gift to something else once it has already been opened may be perceived by the recipient as being inconvenient. This may particularly be the case in the context of a gift purchased on-line, where the gift would likely need to be repackaged for shipping back to the merchant. Accordingly, the recipient may not ultimately convert the gift to something else, even though the gift does not meet the needs or tastes of the recipient.

The gift giving experience through network shopping services would be improved for both senders and recipients if enhanced systems and methods were provided for converting gifts. It will be appreciated that while the teachings herein describe certain features and advantages that may be achieved, the teachings herein may be used to implement systems and methods that do not necessarily have any of these features or advantages, but rather have other features and advantages.

SUMMARY OF THE INVENTION

An exemplary embodiment relates to a computer-implemented data processing system comprising a user interface and gift conversion logic. The user interface is configured to permit users to order products via a network service. The gift conversion logic is in communication with the user interface and permits the users to specify gift conversion rules. For each user that specifies gift conversion rules, the gift conversion rules define a manner in which gifts purchased for the user may be converted.

Another exemplary embodiment relates to a computer-implemented method comprising receiving a gift purchase from a user of a network commerce service, accessing gift conversion rules, and applying the gift conversion rules to a gift purchase to determine whether a gift should be converted. The gift purchase is a purchase of the gift for a gift recipient, and the gift conversion rules are configured for the gift recipient.

Another exemplary embodiment relates to a computer accessible medium whose contents direct a computing system to provide a graphical user interface. The graphical user interface comprises a plurality of screen displays that receive information from users to configure gift conversion rules. The gift conversion rules define a manner in which gifts selected for a user by other users of a network commerce service may be converted.

BRIEF DESCRIPTION OF THE DRAWINGS

FIGS. 4A-4G are exemplary menus that may be presented to a user in connection with the graphical user interface of FIG. 4;

FIG. 5 is an exemplary table representing rules that may be stored in a conversion rules database of FIG. 1;

DETAILED DESCRIPTION OF THE EXEMPLARY EMBODIMENTS

Figure 1:
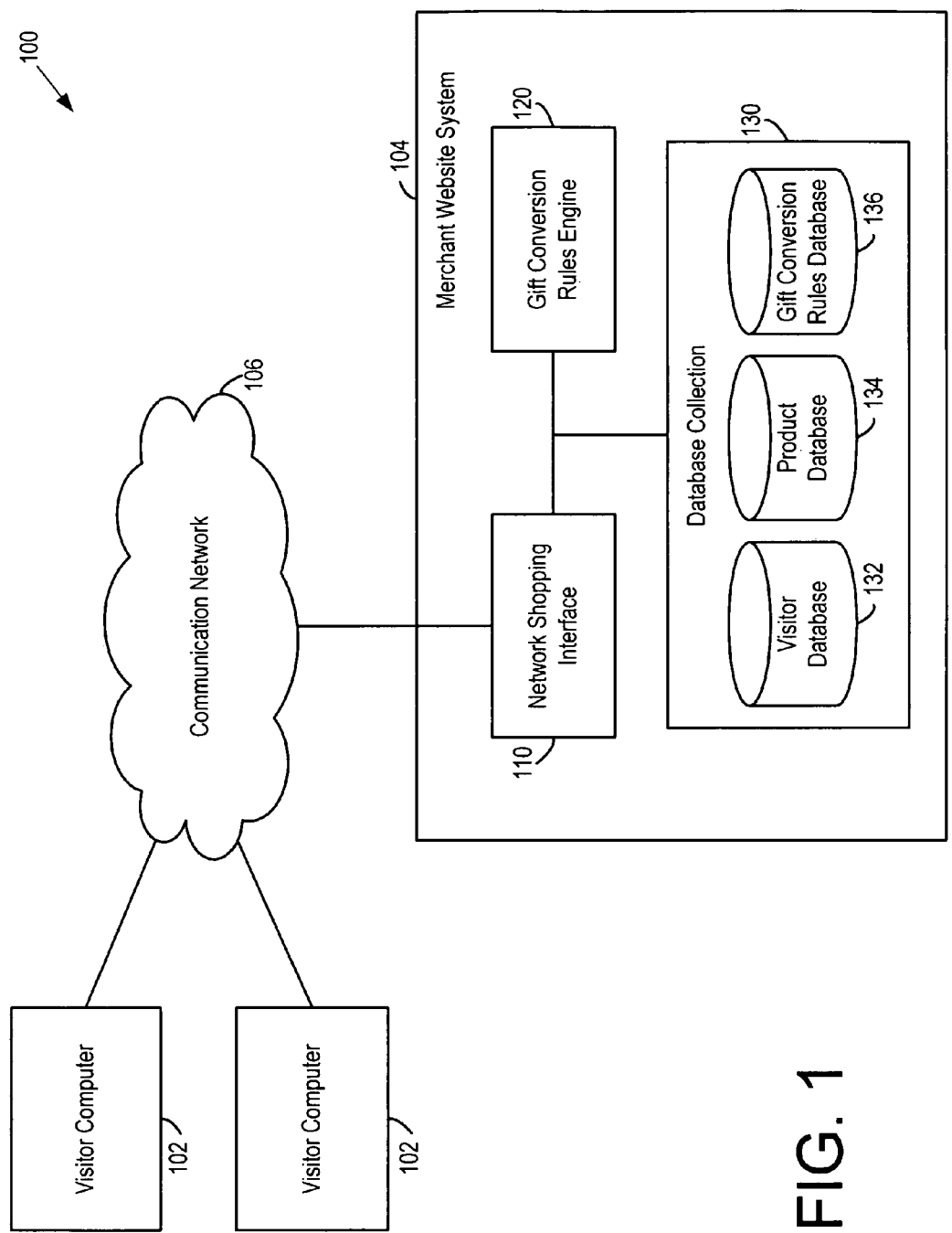
FIG. 1 is a block diagram of a system that includes a merchant website system with a gift conversion rules engine according to an exemplary embodiment.

Referring to FIG. 1, a data processing system 100 is shown which comprises a plurality of visitor computers 102 and a merchant website system 104. The visitor computers 102 may access the website system 104 by way of a communication network 106, such as the Internet. The website system 104 provides a merchant website including a network shopping interface 110, gift conversion rules engine 120, and a collection of databases 130. The databases 130 include a visitor database 132, a product database 134, and a gift conversion rules database 136. Although the databases 132, 134, and 136 are shown as being separate, it will be appreciated that one or more of the databases 132, 134, and 136 may be combined into a single database.

The visitor database 132 stores information concerning users of the website, including users that have previously made purchases on the website. Such information may include, for example, information about previous purchases and other shopping activities, shipping information (e.g., including a shipping address), billing information (e.g., including a billing address, if different than the shipping address), other identification information, other account settings and account information, and so on.

The product database 134 stores information concerning the products offered for sale on the website. Herein, the term "product" includes anything that may be purchased through a network service (e.g., a website), such as goods, services, subscriptions and so on. Such information may include, for example, detailed product information (e.g., pictures, pricing information, customer reviews, and so on) for individual products and categories of products that are offered for sale on the website.

The gift conversion rules database 136 stores information concerning rules for the gift conversion rules engine 120. The rules are useable by the rules engine 120 to determine whether a particular gift purchase should be converted into an alternative form, such as a gift certificate, different gift, gift card, etc. In an exemplary embodiment, the website system 104 may make the gift conversion rules engine 120 accessible to users, and users who expect to be recipients of gifts purchased on the website system 104 may create a set of (i.e., one or more) gift conversion rules to be stored in the database 136. That is, the users may be provided with the ability to configure rules for the rules engine 120. Each rule may specify one or more conditions which, if met, cause a gift conversion to be triggered. As will be described in greater detail below, the rules in database 136 may take into account any combination of the recipient's purchase and gift history, the sender, the product and product features, product categories, value and timing of the gift, quantity, monetary (e.g., dollar) value, and/or any other pertinent information, in any combination. Rules may also be configured which cause the receipt of any gift to trigger a gift conversion, i.e., without regard to any particular conditions being met. Once it is determined that a gift conversion should be triggered, e.g., to a gift certificate, the gift certificate may be made payable to the gift recipient or to a third party, such as a friend, a relative, a charity, and so on. Additionally, the website system 104 may also be configured to convert gifts into other gifts in accordance with the rules specified by the user. Such conversions may include the conversion of a good to a service, a conversion of a service to a good, and so on. Additionally, various messaging may be performed to the recipient and/or to the sender, depending on how the rules in database 136 are configured. Herein, the term "gift certificate" is used to refer to any financial credit that is provided and that may be used for purchasing products, e.g., as a substitute for cash or credit. Gift certificates may include such things as gift cards, stored value cards, coupons that may be redeemed for value, account credits, and so on.

Figure 2:
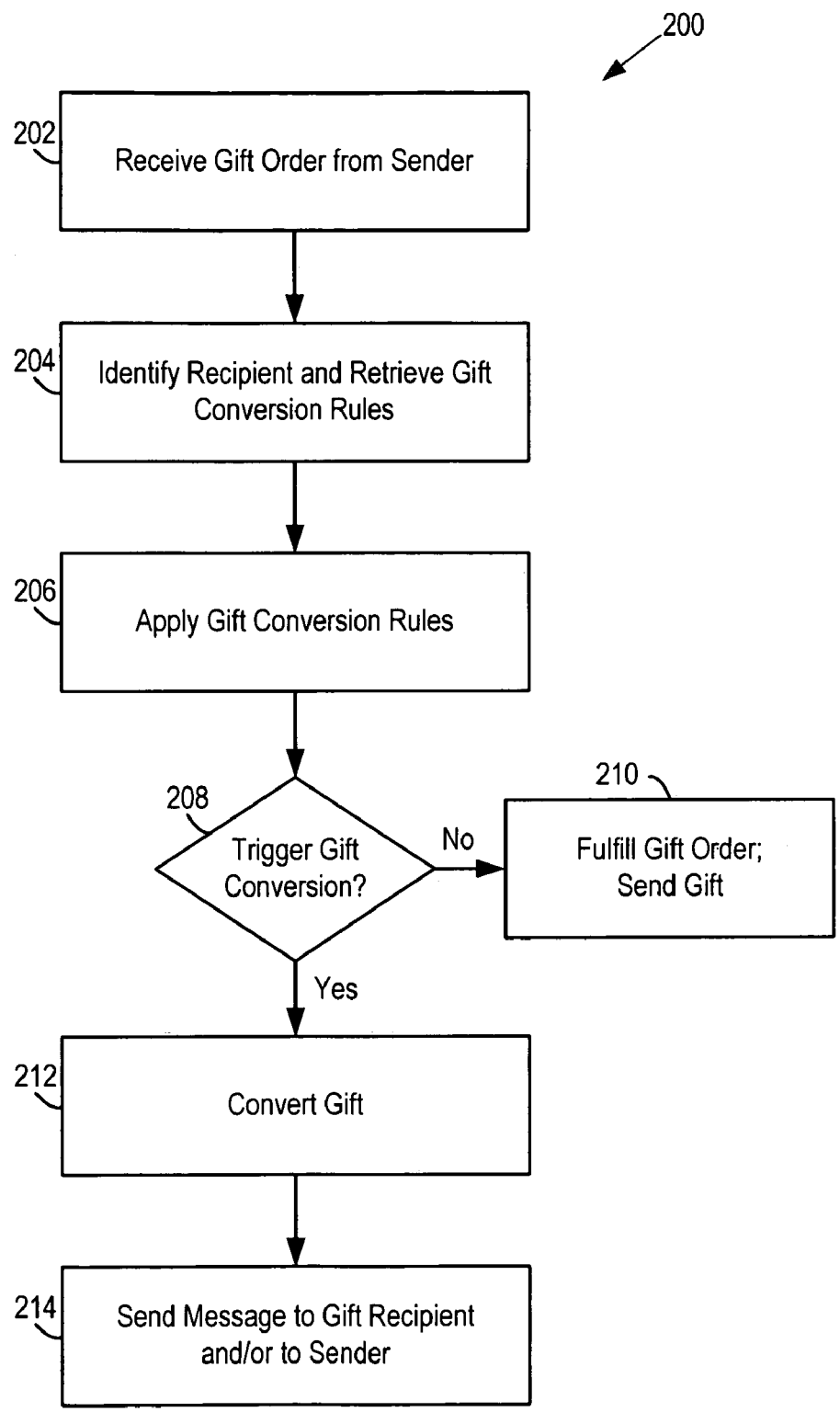
FIG. 2 is a flowchart of a gift conversion process according to an exemplary embodiment.

Referring now also to FIG. 2, in operation, a sender may visit the merchant website and make a gift purchase for a recipient. After the gift order from the sender is received (step 202), the website system 104 proceeds with identifying the recipient of the gift (step 204). The recipient may be identified, for example, by matching information provided by the sender with other information stored in the visitor database 132. For example, when configuring rules for the rules database 136, users may be asked to register with the website system 104 and provide name and address information (i.e., if the user is not already a registered user). The recipient may then be recognized by comparing the name and shipping address of the recipient as provided by the sender with the names and addresses of users in the visitor database 132. Matching algorithms may be used which take into account variations in spelling, formatting, nicknames, and the like. In another embodiment, a unification database may be maintained that reconciles different representations of the same underlying user data. In another embodiment, the recipient may be identified based on other actions of the sender, e.g., the sender has searched for and located the wish list of the recipient, and is sending a gift from the recipient's wish list. In another embodiment, if the set of possible matches can only be narrowed down to a reasonably small number, the sender may be provided with the option to make the final selection. For example, if no exact address match exists, the sender may be provided with the city of residence of various possible matches and with the option of making a final selection. As will be appreciated, various opt-in and/or opt-out arrangements may be used that enable users to opt in or opt out of the system 100 in order to protect their privacy.

Once the recipient is identified, the gift conversion rules for the recipient are retrieved from the conversion rules database 136 by the gift conversion rules engine 120. The gift conversion rules engine 120 then applies the gift conversion rules (step 206) and determines whether a gift conversion should be performed (step 208). If the gift conversion rules engine 120 determines that a gift conversion need not be performed, then the gift ordered by the sender is sent to the recipient (step 210). Otherwise, the gift is converted into a gift certificate or into another gift (step 212), and a message may be sent to the recipient and/or to the sender to provide information regarding the gift conversion (step 214).

Figure 3:
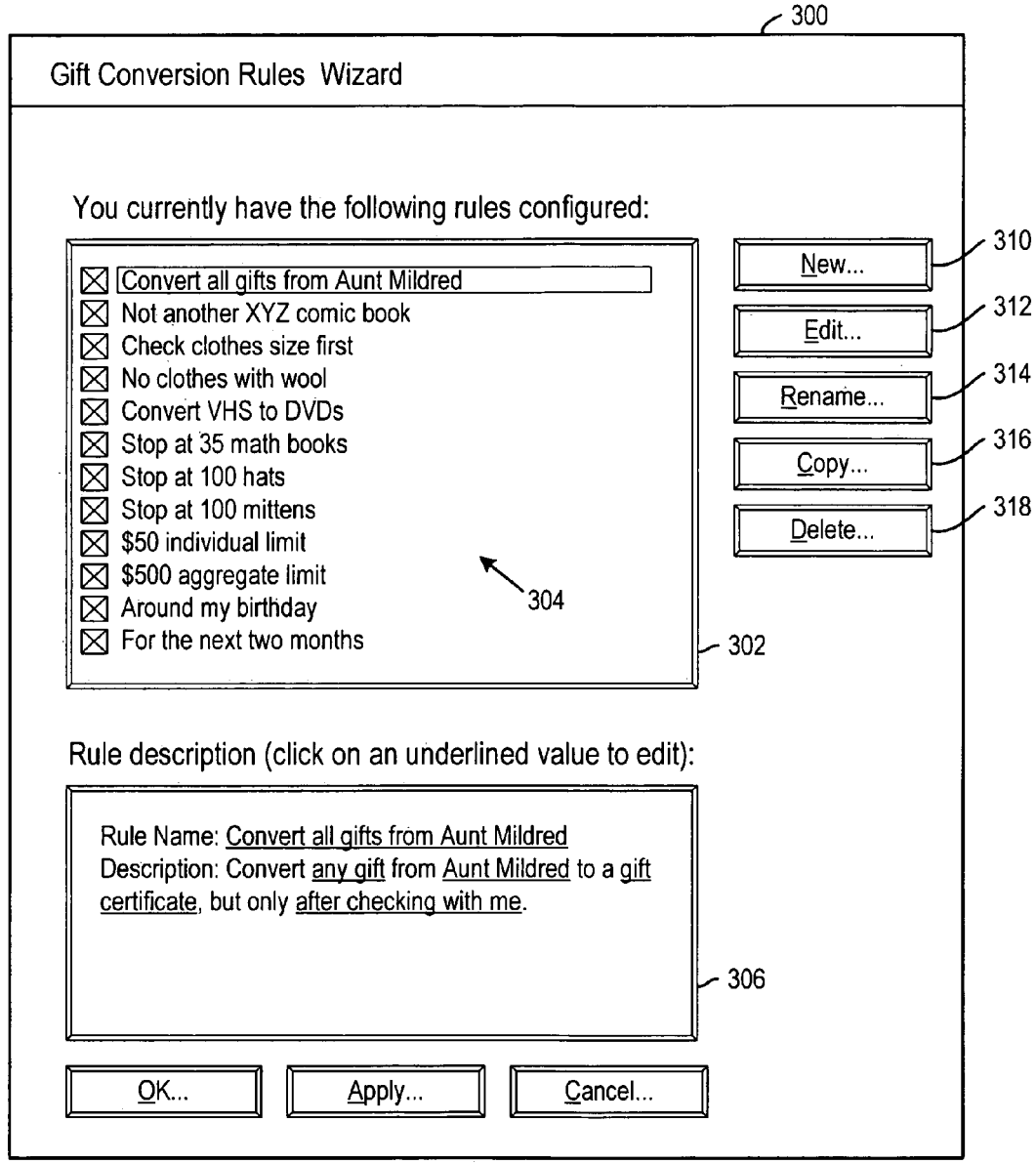
FIG. 3 is an exemplary graphical user interface accessible to a user to configure rules for the gift conversion rules engine of FIG. 1.

Referring now to FIG. 3, FIG. 3 shows a top-level screen display 300 that may be provided to a user to configure and maintain rules in database 136. As previously indicated, users that expect to receive gifts purchased on the website system 104 may create gift conversion rules to be stored in the database 136. For example, the website system 104 may provide an area that permits users to maintain user account settings, and the screen display 300 may be made accessible to users through the user account settings area of the website system 104.

The screen display 300 comprises a window 302 identifying rules 304 that the user currently has configured. Each rule 304 has been given a name by the user. The screen display 300 also comprises a window 306 which provides a description of a selected one of the rules 304. The screen display 300 includes a button 310 that may be selected by the user to create a new rule, a button 312 that may be selected by the user to edit an existing rule, a button 314 that may be selected by the user to rename an existing rule, a button 316 that may be selected by the user to copy an existing rule to create a new rule, and a button 318 that may be selected by the user to delete an existing rule. The description of the selected rule in the window 306 may also provide a direct mechanism for the user to update specific fields in the selected rule, as shown.

Figure 4:
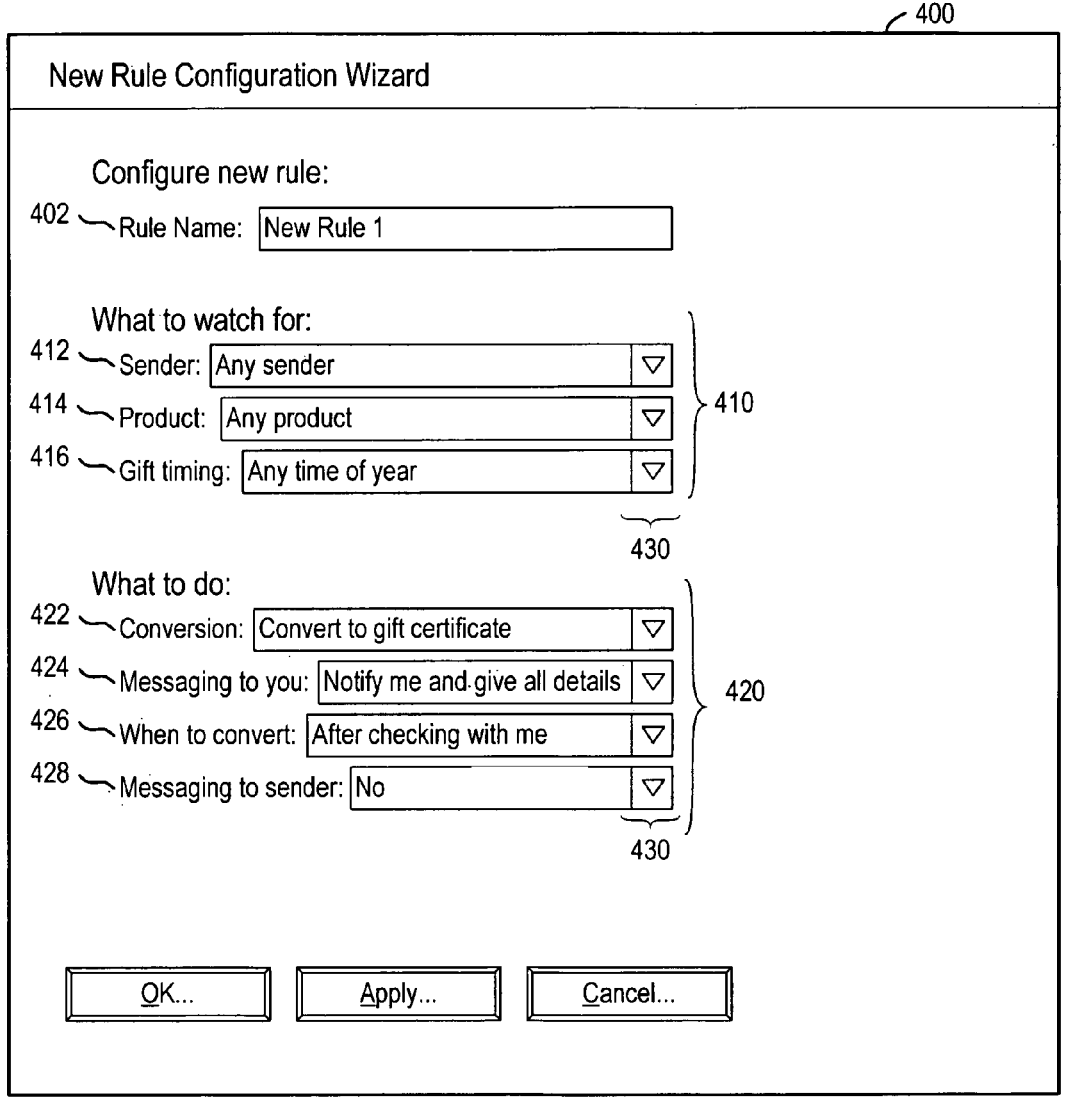
FIG. 4 is an exemplary graphical user interface that enables a user to configure rules for the gift conversion rules engine of FIG. 1.

Referring now to FIG. 4, a screen display 400 for a new rule configuration wizard is shown. The user may, for example, be brought to the screen display 400 after selecting the new rule button 310 in FIG. 3. The screen display 400 comprises a field 402 configured to receive a user-assigned name for the new rule. The screen display 400 further comprises a plurality of fields 410 configured to permit the user to define what types of gift purchases should trigger a gift conversion. The fields 410 include a field 412 configured to permit the user to specify a gift conversion rule based on information about a sender of a gift, a field 414 configured to permit the user to specify a gift conversion rule based on information about a specific product being sent as a gift, and a field 416 configured to permit the user to specify a rule based on information about the timing of the gift.

Figure 4A:
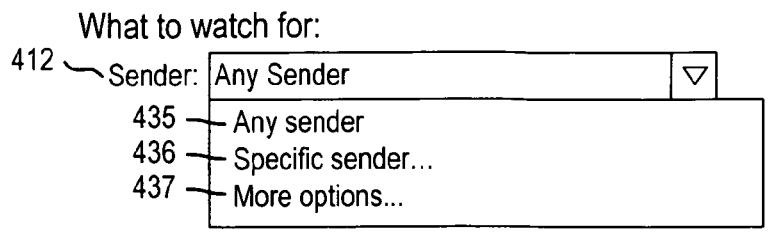
Figure 4B:
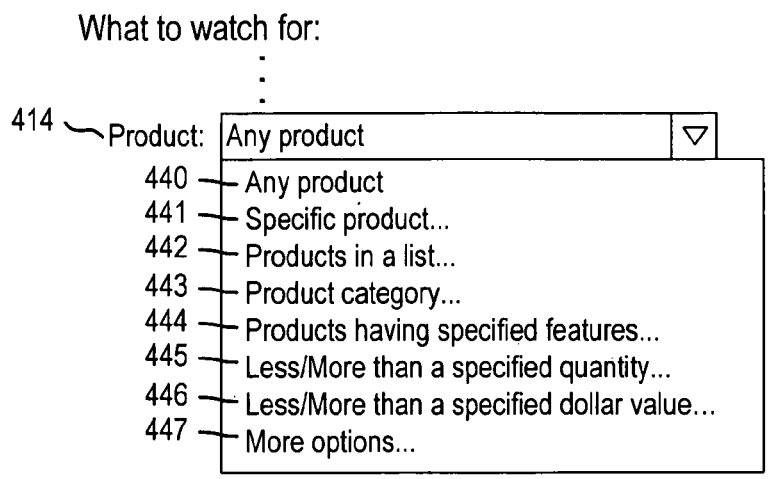
Figure 4C:
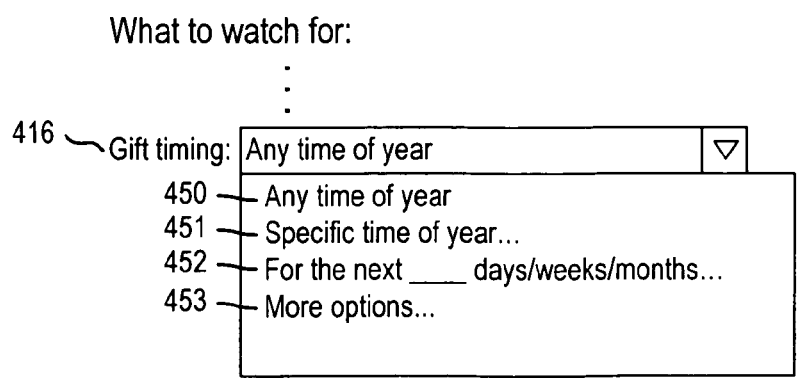

In the example shown in FIG. 4, the user has not specified any information about the sender, the product, or the timing of the gift in fields 412, 414, and 416. Accordingly, with the settings shown in FIG. 4, the gift conversion rule that is created is configured to trigger a gift conversion any time the user receives a gift. In many cases, however, the user may want to be more specific about the circumstances under which a gift conversion should occur. Thus, each of the fields 410 has a button 430 that the user may select in order to configure settings for the respective field. FIGS. 4A-4C show various menus that may be presented to the user when the user selects the button 430 for a respective one of the fields 410. FIG. 5 is a table representing one or more records that may be stored in conversion rules database 136. Accordingly, FIG. 5 shows examples of gift conversion rules that a hypothetical user has created using the configuration wizard of FIG. 4.

Referring first to FIG. 4A, FIG. 4A shows a menu of settings from which the user may select to specify a rule based on information about a sender. The default setting is menu item 435 ("Any sender"). If menu item 435 is selected, then the rule that is created is not configured to take into account the identity of the sender when determining whether to trigger a gift conversion.

By selecting menu item 436 ("Specific sender"), the user is able to specify that a gift conversion should be triggered if the gift is from a particular sender. Upon selecting menu item 436, the user may be provided with additional windows to allow the user to provide additional information concerning the specific sender. For example, the user may be asked to provide information to facilitate identification (e.g., complete name and address information, e-mail address, etc.) of the specific sender for whom a gift conversion should be triggered. When an order is received for a gift for the user, the rules engine 120 may then compare the billing address information entered by the sender against the address information provided by the user to identify the sender and thereby to determine whether a gift conversion should be triggered.

An example of such a rule is shown by rule 501 in FIG. 5. Rule 501 has been given the user-assigned name of "Convert all gifts from Aunt Mildred." For example, the user may specify such a rule because the user believes that this potential sender has different tastes than the user. To create the rule 501, the user may select menu item 436 ("Specific sender") and then provide additional information as prompted by rules engine 120. For example, the user may be asked to provide complete name and address information or other information that may be used to identify the person that is the subject of the gift conversion rule. For example, if the system 100 maintains account information for users that have previously made purchases, and if the account information for each such user has an associated visitor ID, then the name and address information may be used to determine the visitor ID (or "Sender ID" in FIG. 5) of the person that is the subject of the gift conversion rule. When an order is received for a gift for the user, the rules engine 120 may then determine whether the gift is from "Aunt Mildred" (e.g., based on Sender ID) and, if it is, a gift conversion is triggered. In another exemplary embodiment, the sender may be identified at the time the gift purchase is received by the system 100 by matching the information provided by the user with the billing information provided by the sender. In an exemplary embodiment, once the gift conversion is triggered, what happens as a result of the gift conversion is also configurable. For example, this information may be stored as part of rules stored in conversion rules database 136, as described in greater detail below in connection with FIGS. 4D-4G. In the example shown in FIG. 5, the action taken by the rules engine 120 is to convert the gift from Aunt Mildred to a gift certificate.

Returning to FIG. 4A, by selecting menu item 437 ("More options"), the user is able to specify that a gift conversion should be triggered based on other conditions (e.g., based on additional parameters, based on combinations of parameters, and so on). For example, the user may be provided with the ability to define the sender in terms of a social network, a category of senders, whether the recipient has typically returned gifts from a particular sender in the past, user-defined rules for senders (e.g., senders having a billing address meeting certain parameters), and so on.

Referring now to FIG. 4B, FIG. 4B shows a menu of settings from which the user may select to specify a gift conversion rule based on information about a specific product being sent as a gift. The default setting is menu item 440 ("Any product"). If menu item 440 is selected, then the rule that is created is not configured to take into account the specific product that is being given when determining whether to trigger a gift conversion.

By selecting menu item 441 ("Specific product"), the user is able to specify that a gift conversion should be triggered if the gift is a specific product. Upon selecting menu item 441, the user may be provided with additional windows to allow the user to provide additional information concerning the specific product. For example, the user may be asked to provide a product ID number. Accordingly, when a gift order has been received for the user, the information provided by the user when configuring the rule may be compared against the product that is being sent to determine whether a gift conversion should be triggered.

An example of such a rule is shown by rule 502 in FIG. 5. Rule 502 has been given the user-assigned name of "Not another XYZ comic strip calendar." For example, the user may have received a particular comic strip calendar for the past several years, and may want something different this year. To create the rule 502, the user may select menu item 441 ("Specific product") and then provide additional information as prompted by rules engine 120. For example, the user may be asked to provide a product ID number for the calendar. When an order is received for a gift for the user, the rules engine 120 may then determine whether the gift being sent is the particular comic strip calendar specified by the user and, if it is, a gift conversion is triggered. In the example shown in FIG. 5, the action taken by the rules engine 120 is to convert the particular comic strip calendar gift to a gift certificate.

In other exemplary embodiments, other or additional graphical user interfaces may also be provided for configuring gift conversion rules to trigger gift conversions based on particular products (e.g., or product categories, etc.). For example, the user may be provided with the ability to configure gift conversion rules automatically by selecting appropriate buttons provided on web pages that provide detailed product information. Examples of such other graphical user interfaces are described in connection with FIGS. 6-7, below. As will also be appreciated, the rules engine 120 may be configured to create product-specific rules upon the purchase of a product by the user on the merchant website. That is, for example, if the user purchases a CD on the merchant website, a rule may automatically be created that causes a gift conversion to be triggered if a sender attempts to send the user another copy of the same CD as a gift. The action taken as a result may be made configurable (e.g., on a global basis, on a case-by-case basis, or in another manner) using the graphical user interface described below in connection with FIGS. 4D-4G.

By selecting menu item 442 ("Products in a list"), the user is able to specify that a gift conversion should be triggered if the gift is a product from among a pre-designated list of products. For example, the user may specify a list of all the CDs the user owns. Alternatively, if the user is known among the user's friends and relatives to enjoy a particular musical performer or group, the user may specify a list of the CDs of that performer or group that the user already owns, so as to avoid receiving any duplicates. The user may then create and maintain this list in the manner as described above in connection with menu item 441, except that multiple specific products may be specified.

By selecting menu item 443 ("Product category"), the user is able to specify that a gift conversion should be triggered if the gift is a product from within a particular product category. Upon selecting menu item 443, the user may be provided with additional windows to allow the user to provide additional information to specify the product category. When an order is received for a gift for the user, the rules engine 120 may then determine whether the gift being sent is from within the product category specified by the user and, if it is, a gift conversion is triggered.

An example of such a rule is shown by rule 503 in FIG. 5. Rule 503 has been given the user-assigned name of "Check clothes sizes first." For example, a user may wish to check the sizes of clothes before the clothes are received as gifts. To create the rule 503, the user may select menu item 443 ("Product category") and then provide additional information as prompted by the rules engine 120. The definitions of product categories may be provided by the website system 104, for example, based on browse nodes or another product classification system. For example, the website system 104 may provide one or more menus of product categories, and the user may be asked to select a product category from the menu of product category selections. As will be appreciated, the user may be provided with the ability to drill down into menu items and to select product categories at different levels of granularity (e.g., "apparel" versus "apparel→winter apparel→hats and mittens→children's mittens," or any level therebetween). Accordingly, the corresponding gift conversion rule will be triggered whenever the gift being sent falls within the selected product category. As will be described in greater detail below in connection with FIG. 4D, once a gift conversion is triggered, an action may be taken by the rules engine 120 to automatically convert the gift. In the example shown in FIG. 5, the action taken by the rules engine 120 is to automatically convert the gift to another size.

Returning to FIG. 4B, selecting menu item 444 ("Products having specified features"), the user is able to specify that a gift conversion should be triggered if the gift is a product having particular features. Upon selecting menu item 444, the user may be provided with additional windows to allow the user to provide additional information to specify the products and product features. When an order is received for a gift for the user, the rules engine 120 may then determine whether the gift being sent is the particular product with the specified product features and, if it is, a gift conversion is triggered.

Examples of such a rule are shown by rules 504 and 505 in FIG. 5. Rule 504 has been given the user-assigned name of "No clothes with wool." For example, a user may not wish to receive clothes made from wool because the user is allergic to wool. To create the rule 504, the user may select menu item 444 ("Products having specified features") and then provide additional information as prompted by rules engine 120. For example, the user may be prompted to first select a product category (e.g., "apparel"). Based on the product category selected, the user may then be prompted to select from product features for products in that category (e.g., "fabric→wool"). As another example, rule 505 has been given the user-assigned name of "Convert VHS to DVDs." For example, the user may not own a VHS player, and may wish to receive all gifts of movies in DVD format. In this case, after selection of the product category (e.g., "Movies"), the user may be prompted to select from product features for products in that category (e.g., "format→VHS"). In the case of movies, other product features from which the user may be prompted to select may include, for example, genre (e.g., to trigger a conversion if a gift is a movie in the genre of "love stories"), age-appropriateness (e.g., to trigger a conversion if a gift for a child is a movie designated as having an "R" movie rating), and so on. As another example, a rule may be configured to trigger a gift conversion based on the gift being software and not being intended for a particular operating system, or based on the gift being a video game and not being intended for a particular hardware platform. Again, the product category selections and product feature selections may be configured to be made at different levels of granularity. Once a gift conversion is triggered, the gift conversion rules engine 120 may be configured to convert the gift to another size, to another format, and so on, as described below in connection with FIG. 4D.

Returning to FIG. 4B, by selecting menu item 445 ("Less/More than a specified quantity"), the user is able to specify that a gift conversion should be triggered if the user has received more than or less than a specified quantity of a specified product. Upon selecting menu item 445, the user may be provided with additional windows to allow the user to provide additional information concerning the specified product. For example, the user may be prompted to identify products, product categories, products having specified features, or another product designation (e.g., in a manner similar to that described above). The user may also be prompted to specify the quantity and to specify what should happen once the specified quantity has been reached. The user may also be prompted to set a time limit for reaching the specified quantity and what should happen if the specified quantity is not reached as of the expiration of the deadline. Accordingly, as gift orders are received for the user, the information provided by the user may be compared against the products that have been sent to determine whether a gift conversion should be triggered.

An example of such a rule is shown by rule 506 in FIG. 5. Rule 506 has been given, the user-assigned name of "Stop at 35 math books." For example, the user may be a school which has indicated to prospective donors what it would like to receive (e.g., $5^{th}$ grade math textbooks). (Herein, the term "gift" includes a donation.) To create the rule 506, the user may select menu item 445 ("Less/More than a specified quantity") and then provide additional information as prompted by rules engine 120 (e.g., to select the particular math textbook in a manner similar to that described above in connection with menu item 441). When an order is received for a gift for the user, the rules engine 120 may then determine the aggregate quantity of math textbooks received. In the illustrated example, if more than the specified number of math textbooks has already been received (i.e., 35), any additional donations are converted to a gift certificate.

Additional examples of such a rule are shown by rules 507 and 508 in FIG. 5. Rules 507 and 508 have been given the user-assigned names of "Stop at 100 hats" and "Stop at 100 mittens," respectively. For example, the user may be a charity which has indicated to prospective donors what it would like to receive (e.g., "We need warm hats and mittens for children this winter."). To create the rule 507, the charity may select menu item 445 ("Less/More than a specified quantity") and then provide additional information as prompted by rules engine 120 (e.g., to select the product categories of children's hats and children's mittens, respectively). When an order is received for a gift (i.e., donation) for the charity, the rules engine 120 may then determine the aggregate quantity of hats and mittens received. The charity may then use rules 507 and 508 to maintain an appropriate balance between the various gifts ("we received too many hats and not enough mittens, but no problem"), as well as to turn excess donations ("we now have all the hats and mittens that we need") into gift certificates for later use. Thus, for example, when the charity receives the $101^{st}$ hat, a gift conversion will be triggered and the charity can check to see how many pairs of mittens it has received. If it has received only fifty pairs of mittens, the charity can convert future gifts of hats to mittens. Otherwise, if the charity has received roughly the same number of hats and mittens, then it can configure the rules engine 120 to keep permitting future donations of hats and mittens. Alternatively, if the charity has all the hats and mittens it needs, it can configure the rules engine 120 to convert future donations to something else. As will be appreciated, rules engine 120 may also be configured to prompt the user to provide additional information for use in monitoring the relative numbers of gifts and to permit the monitoring to be performed automatically.

Again referring to FIG. 4B, by selecting menu item 446 ("Less/More than a specified dollar value"), the user is able to specify that a gift conversion should be triggered if the dollar value of the gift is more than or less than a specified value. Upon selecting menu item 446, the user may be provided with additional windows to allow the user to provide additional information. For example, the user may be prompted to set a dollar value threshold and to specify whether the dollar value threshold is for a particular gift, an aggregate dollar value for gifts received during a specified time period, and so on. If the dollar value threshold is for an aggregate dollar of gifts received during a specified time period, the user may also be prompted to specify the time period. Accordingly, as gift orders are received for the user, the information provided by the user may be compared against the dollar value of product or products that have been sent to determine whether a gift conversion should be triggered. As will be appreciated, rules engine 120 may also be configured to permit the user to specify an aggregate monetary value in currencies other than the dollar, such as euros, pounds, marks, francs, yuan, yen, and so on.

Examples of such a rule are shown by rules 509 and 510 in FIG. 5. Rules 509 and 510 have been given the user-assigned names of "$50 individual limit" and "$500 aggregate limit," respectively. For rule 509, a gift conversion is triggered if the value of any one gift exceeds $50. For rule 510, a gift conversion is triggered if the aggregate value of gifts received exceeds $500 during a specified time period (e.g., MM1-DD1-YY1 to MM2-DD2-YY2). For example, the user may decide to take the cash value of the gifts and put the cash value towards the purchase of a single, more expensive product.

Again referring to FIG. 4B, by selecting menu item 447 ("More options"), the user is able to specify that a gift conversion should be triggered based on other conditions relating to the product (e.g., based on combinations of the above parameters, based on other parameters, and so on). For example, the user may configure a rule which causes a gift conversion to be triggered if a gift is valued at over $500 and is in the product category of clothes.

Referring now to FIG. 4C, FIG. 4C shows a menu of settings from which the user may select to specify a rule based on information about the timing of the gift. The default setting is menu item 450 ("Any time of year"). If menu item 450 is selected, then the rule that the user creates does not relate to the gift being sent at any particular time of year, and the fact that the gift is sent on a particular date or in a particular month or season does not trigger a gift conversion.

By selecting menu item 451 ("Specific time of year"), the user is able to specify that a gift conversion should be triggered if the gift is sent at a specific time of year. Upon selecting menu item 451, the user may be provided with additional windows to allow the user to provide additional information to specify the time of year. For example, the user may be provided with calendar functionality which may be used to specify the time of year. When an order is received for a gift for the user, the rules engine 120 may then determine whether the gift is being sent during the specified time of year and, if it is, a gift conversion is triggered.

An example of such a rule is shown by rule 511 in FIG. 5. Rule 511 has been given the user-assigned name of "Around my birthday." For rule 511, a gift conversion is triggered if a gift is received during the time period spanning MM1-DD1-YY1 to MM2-DD2-YY2, where MM1-DD1-YY1 and MM2-DD2-YY2 are two different dates. For example, a user may wish to trigger a rule conversion for any gift received during a time period preceding the user's birthday (e.g., MM2-DD2-YY2 in the above example).

Returning to FIG. 4C, by selecting menu item 452 ("For the next _____ days/weeks/months"), the user is able to specify that a gift conversion should be triggered if the gift is sent during a predetermined time period after the rule is configured (e.g., for the next five days, for the next week, for the next two months, for the next year, and so on). Thus, whereas menu item 451 permits the time period to be specified in absolute terms (e.g., from a first date to a second date), menu item 452 permits the time period to be specified in relative terms (e.g., for the next two months). Upon selecting menu item 452, the user may be provided with additional windows to allow the user to provide additional information to specify the time period. When an order is received for a gift for the user, the rules engine 120 may then determine whether the gift is being sent during the specified time period and, if it is, a gift conversion is triggered. An example of such a rule is shown by rule 512 in FIG. 5.

By selecting menu item 453 ("More options"), the user is able to specify that a gift conversion should be triggered based on other conditions relating to the timing of the gift (e.g., based on combinations of the above parameters, based on other parameters, and so on). For example, the user may configure a rule which causes a gift conversion to be triggered if a gift is valued at over $100 and is received during a time period preceding the user's birthday. As another example, the user may wish to configure a rule which causes a gift conversion to be triggered if any gifts of home appliances are received in the three weeks prior to the user's birthday from any out-of-state relatives, unless the gift is a two-slice toaster or a bread machine.

Returning now to FIG. 4, the screen display 400 further comprises a plurality of fields 420 configured to permit the user to define what should happen (i.e., what action(s) should be taken) once a gift conversion has been triggered. The fields 420 include a field 422 configured to permit the user to specify information about the conversion that should occur, a field 424 configured to permit the user to specify information about whether and how a message should be sent to the user when a conversion occurs, a field 426 configured to permit the user to specify information about whether and to what extent permission of the user should be sought before performing the gift conversion, and a field 428 configured to permit the user to specify information about whether and how a message should be sent to the sender of the gift when a conversion occurs. Thus, whereas fields 410 described above may be used to configure the circumstances under which a gift conversion should be triggered, fields 420 described below may be used to configure what should happen once a gift conversion is triggered. The information specified using fields 422-428 may be in the database records represented in FIG. 5 along with the information specified using fields 412-416. (Although only a single "Action" column is shown in FIG. 5 for storing the information specified using fields 422-428, it will be appreciated that the information may be stored in any suitable format.)

Figure 4D:
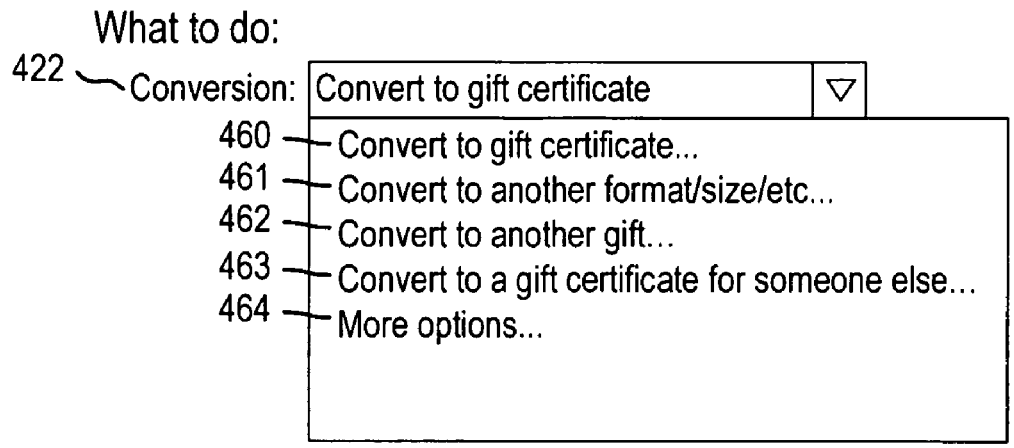

FIGS. 4D-4G show various menus that may be presented to the user when the user selects the button 430 for a respective one of the fields 420 illustrated in FIG. 4. Referring now to FIG. 4D, FIG. 4D shows a menu of settings from which the user may select to specify a rule about the nature of the gift conversion that should occur (e.g., whether the gift should be converted into a gift certificate, whether the gift should be converted to another gift, whether the gift should be converted to the same gift but in a different size, format, and so on, and whether the gift should be converted to a gift for someone else, and so on). The default setting is menu item 460 ("Convert to gift certificate"). If menu item 460 is selected, then the gift is converted to a gift certificate. The gift certificate that results from a gift conversion may be issued to the recipient immediately. Alternatively, the gift certificate may be combined with other gift certificates from other gift conversions, such that the recipient accrues a gift certificate balance to apply toward subsequent purchases on the website system 104. In another embodiment, whether the gift certificate is issued immediately or combined with other gift certificates is a user configurable parameter selectable by the user upon selection of menu item 460.

In an exemplary embodiment, the value of the gift certificate may be the value of the gift alone. In another exemplary embodiment, the value of the gift certificate may include shipping and taxes as well. In another exemplary embodiment, the user may be allowed to take advantage of any preferred pricing rates for shipping and handling that are available to the sender. For example, if the sender is able to take advantage of preferred pricing for shipping and handling (e.g., because the sender pays a subscription fee to belong to a preferred-pricing program), the preferred pricing that the sender would have paid for shipping the gift may be made available to the recipient in connection with any substitute products ordered with the gift certificate (e.g., as a one-time enticement offer).

By selecting menu item 461 ("Convert to another format/size/etc."), the user is able to specify that the gift should be converted to another format, size, and so on. Upon selecting menu item 461, the user may be provided with additional windows to allow the user to provide additional information to specify the nature of the format, size, or other conversion that should occur.

For example, as discussed above in connection with rule 503, a rule may be configured which triggers a gift conversion based on the gift being apparel (e.g., clothes, shoes, jewelry, or anything else that may be worn). Menu item 461 may be used to specify the conversion that should occur for the clothes (e.g., from a "medium" shirt to a "large" shirt, from a size 10 dress to a size 8 dress, and so on). Thus, for example, if the user wears a size large, the user may configure to the rule 503 to automatically convert any gift of clothing other than a size large to a size large. This avoids the user having to let friends and relatives know what size clothing the user wears, and the friends and relatives do not need to worry about what size the user wears when ordering clothes for the user. Based on a knowledge of the product category (e.g., clothes) and the product feature (e.g., any size other than large), the rules engine 120 may be configured to prompt the user with an appropriate selection of size conversions from which the user may select (e.g., a conversion to large from any size other than large). As another example, as discussed above, rule 505 may be configured to trigger a gift conversion based on the gift being a movie which is not in DVD format. In the case of rule 505, the user may use menu item 461 to specify that the gift should be converted to the same movie in DVD format. As will be appreciated, upon selection of menu item 461, the user may also be prompted to provide for other contingencies. For example, a user may be permitted to specify that, in the event that a movie ordered in VHS format is not available in DVD format, the gift should be converted to another movie on the user's wish list, or else converted into a gift certificate. If the original gift costs more than the converted gift, then the recipient and/or the sender may be refunded the surplus (e.g., in the form of a gift certificate). Alternatively, if the original gift costs less than the converted gift, then the recipient and/or the sender may be provided with the ability to pay the deficiency to permit the conversion to be completed.

By selecting menu item 462 ("Convert to another gift"), the user is able to specify that the gift should be converted to another gift. Menu item 462 is similar to menu item 461, but may be used for other types of gift substitutions in addition to format/size substitutions. Upon selecting menu item 462, the user may be provided with additional windows to allow the user to provide additional information concerning the substitute gift.

In an exemplary embodiment, the user may specify that the substitute gift should be selected from a wish list of the user. The wish list may be a list of items that the user has previously specified as being of interest (e.g., to be purchased later by the user, to be purchased later by someone that is purchasing a gift for the user, and so on). The wish list may, for example, be a list of products that the user has created/updated by adding products while shopping on the website (e.g., instead of purchasing the product immediately). In an exemplary embodiment, the substitute gift may be selected from the wish list automatically. For example, the substitute gift may be selected based on a comparison of a monetary value of the gift with monetary values of different products in the wish list (e.g., such that the product in the wish list having a monetary value closest to, or closest to but not exceeding, the monetary value of the gift is selected). For example, a user may specify that any CD the user receives should be exchanged for the first CD of the same or comparable value on their wish list (e.g., with any differences in value being converted into a gift certificate or being deducted from the existing gift certificate balance). As another example, the substitute gift may be selected based on a comparison of when different products were added to the wish list. For example, the item selected may be the most recently added product in the wish list, the product that has been on the wish list the longest, and so on. As another example, the substitute gift may be selected based on a ranking of different items in the wish list. For example, a user-specified ranking may be given to the item by the user when adding the item to the wish list (e.g., "must have," "nice to have," and so on), and the user-specified ranking may be taken into account in selecting the substitute gift from the wish list. As another example, the ranking may be determined automatically based on past shopping activity of the gift recipient (e.g., past browsing activity, past purchases of the gift recipient, past purchases of other users with similar interests as the gift recipient, and so on). The substitute gift may then be selected based on the ranking of the items in the wish list (e.g., the product with the highest ranking may be selected). Again, if the substitute gift does not cost the same as the original gift, the recipient and/or the sender may be refunded the surplus or provided with the ability to pay any deficiency, as appropriate.

By selecting menu item 463 ("Convert to a gift certificate for someone else"), the user is able to specify that the gift should be converted to a gift certificate for another person or entity. Upon selecting menu item 463, the user may be provided with additional windows to allow the user to provide additional information concerning the other person or entity to whom the gift certificate should be directed. For example, the user may configure a gift conversion rule in which default values (e.g., any sender, any product, any gift timing) are used for fields 412, 414, and 416 and in which the menu item 463 is configured such that the gifts are redirected to a favorite charity of the user. As a result, any gift the user receives is converted to a donation to the favorite charity.

By selecting menu item 464 ("More options"), the user is able to specify other actions that should occur (e.g., based on combinations of the above actions, based on other actions, and so on). For example, the user may be permitted to combine menu items 461 and 463 to configure a rule which converts a gift of clothing to another size and redirects the gift to someone else.

Figure 4E:
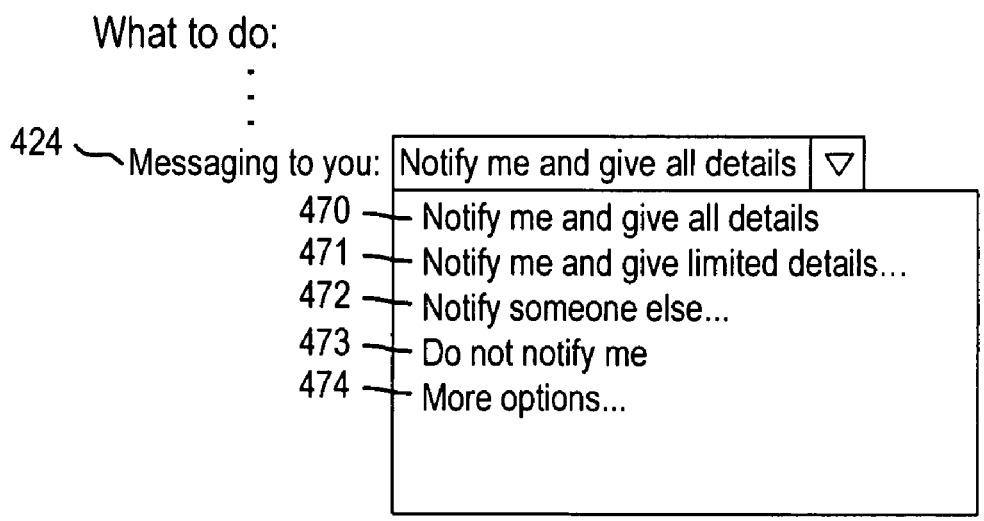

Referring now to FIG. 4E, FIG. 4E shows a menu of settings from which the user may select to specify a rule about whether/how messaging to the user should be performed. The default setting is menu item 470 ("Notify me and give all details"). If menu item 470 is selected, the user may be provided with complete information about the identity of the sender and about the gift (e.g., including a link to a product detail page for the gift on the merchant website).

By selecting menu item 471 ("Notify me and give limited details"), the user is able to specify that the user should receive only limited information. Upon selecting menu item 471, the user may be provided with additional windows to allow the user to provide additional information concerning the information that is to be provided. For example, for a gift conversion that is triggered based on a gift of clothes (e.g., as in the case of rule 503), the user may select item 471 and specify that the information to be provided should only include the fact of the gift and the manufacturer of the clothing. Consequently, the user may ensure the clothing size is correct (e.g., by selecting a new clothing size, if appropriate) without necessarily finding out everything about the gift the user will be receiving.

By selecting menu item 472 ("Notify someone else"), the user is able to specify that the user should not receive any notification but rather another person should be notified. Upon selecting menu item 472, the user may be provided with additional windows to allow the user to provide additional information concerning the person that should be notified and an appropriate mechanism for notification (e.g., an e-mail address). For example, the user may designate a spouse of the user as the person to be notified. As a result, the spouse can ensure that the gift is likely to be appropriate, without the user finding out about the gift the user will be receiving.

By selecting menu item 473 ("Do not notify me"), the user is able to specify that the user should not receive any notification. For example, if the user is a large charity or other entity, it may not be practical for the user to consider and respond to each and every gift conversion.

By selecting menu item 474 ("More options"), the user is able to specify other messaging that should occur (e.g., based on combinations of the above actions, based on other actions, and so on). Additionally, the user may be provided with the ability to configure how the messaging should occur (e.g., via e-mail, fax, automated telephone message, and so on), and may also provide contact information (e.g., e-mail address, fax number, telephone number, and so on) if such information has not already been provided.

Referring now to FIG. 4F, FIG. 4F shows a menu of settings from which the user may select to specify a rule about when the gift conversion should be performed. The default setting is menu item 480 ("After checking with me"). If menu item 480 is selected, then the gift conversion is not completed until the user has explicitly authorized the conversion (e.g., by selecting a link in an e-mail notification, reviewing the gift, and approving or declining the proposed gift conversion).

As will be appreciated, if menu item 480 is selected, the timely shipping of gifts may be interrupted. For example, if a sender places an order for a birthday present one week before the user's birthday, and the gift conversion is to be approved by the user, the original gift may not reach the user in time for the user's birthday (e.g., if the gift conversion is declined). However, if the user's birthday is known, the user's birthday may be taken into account in deciding when to ship the gift. For example, rules engine 120 may be configured to permit the user to wait until a specified time before the deadline event (e.g., until four days before the user's birthday), and then ship all gifts absent instructions to the contrary. The user may then be aware that the user should check to determine whether there are any gift conversions to be reviewed at the specified time (e.g., four days before the user's birthday). Of course, if a gift does ship, and the user eventually decides that the gift does not meet the user's needs or tastes, the user may also be given the opportunity to exchange the gift in normal fashion.

By selecting menu item 481 ("After notifying me, and if I have not responded in _____ days"), the user is able to specify that the user should be notified, but that the gift conversion should proceed unless the user affirmatively declines the gift conversion within a predetermined period of time. Upon selecting menu item 481, the user may be provided with additional windows to allow the user to provide additional information concerning the amount of time that should elapse before the gift conversion is finalized. Menu item 481 may be similar to the arrangement described above in connection with the user's birthday, except that it need not be associated with any particular deadline event (e.g., the user's birthday).

By selecting menu item 482 ("Immediately, without checking with me"), the user is able to specify that the gift conversion should occur automatically, without the need to check with the user. For example, if the user has specified that gifts are to be converted to items selected from the user's wish list (e.g., when the available gift certificate balance becomes sufficient), the user may be comfortable with permitting the conversion to proceed without any further involvement. As another example, a user may specify that all gifts are to be converted (i.e., all gifts from any sender, of any product, and at any time of year), and that the gift conversion should occur automatically. This permits all gifts to be converted to items from the user's wish list without further involvement of the user.

By selecting menu item 483 ("More options"), the user is able to specify other parameters that should be met before a gift conversion is finalized (e.g., based on combinations of the above parameters, based on other parameters, and so on). For example, as described below, senders may also be provided with the ability to configure conversion rules for the rules engine 120. By selecting menu item 483, the user may be provided with the ability to specify responses to various settings that may be present in connection with the gift conversion rules of the sender.

Referring now to FIG. 4G, FIG. 4G shows a menu of settings from which the user may select to specify a rule about whether/how messaging to the sender should be performed.

The default setting is menu item 490 ("None"). If menu item 490 is selected, then the sender is not notified of the gift conversion.

By selecting menu item 491 ("Yes, and send a thank you note"), the user is able to specify that a thank you note should be sent. Upon selecting menu item 491, the user may be provided with additional windows to configure how the text of the thank you note is generated, whether the thank you note is system-generated, generated by the user but generic for all gifts, custom-generated by the user for each gift, and so on. The user may also be provided with the option of sending a thank you note for the original gift, even though the original gift is converted.

By selecting menu item 492 ("Yes, and give the sender the option to change gift"), the user is able to specify that the sender should be notified that the gift is likely to be converted to something else, and to give the sender the option to change the gift. Upon selecting menu item 492, the user may be provided with additional windows to allow the user to configure the nature and amount of information provided to the sender, including information concerning the user's gift preferences as embodied in the gift conversion rules. The user may also be provided with the ability to configure which senders may be provided with access to this information (e.g., so that only the user's friends and family are provided with access to the user's gift conversion rules). For example, the sender may be notified of the user's preferences prior to completing a gift purchase and given the option to send the gift certificate or to select a gift from the user's wish list, instead of sending the gift. As another example, the sender may be notified prior to purchasing or sending the gift that the gift is likely to be converted, and may be offered the alternatives of either giving a gift certificate instead, selecting items from the user's wish list, or proceeding with sending the gift even though it may later be converted.

By selecting menu item 493 ("More options"), the user is able to specify other aspects of messaging to the sender. As will be appreciated, although the various parameters described in connection with FIGS. 4A-4G are described as being user configurable, it will be appreciated that a greater or lesser degree of user configurability may also be employed.

Figure 6:
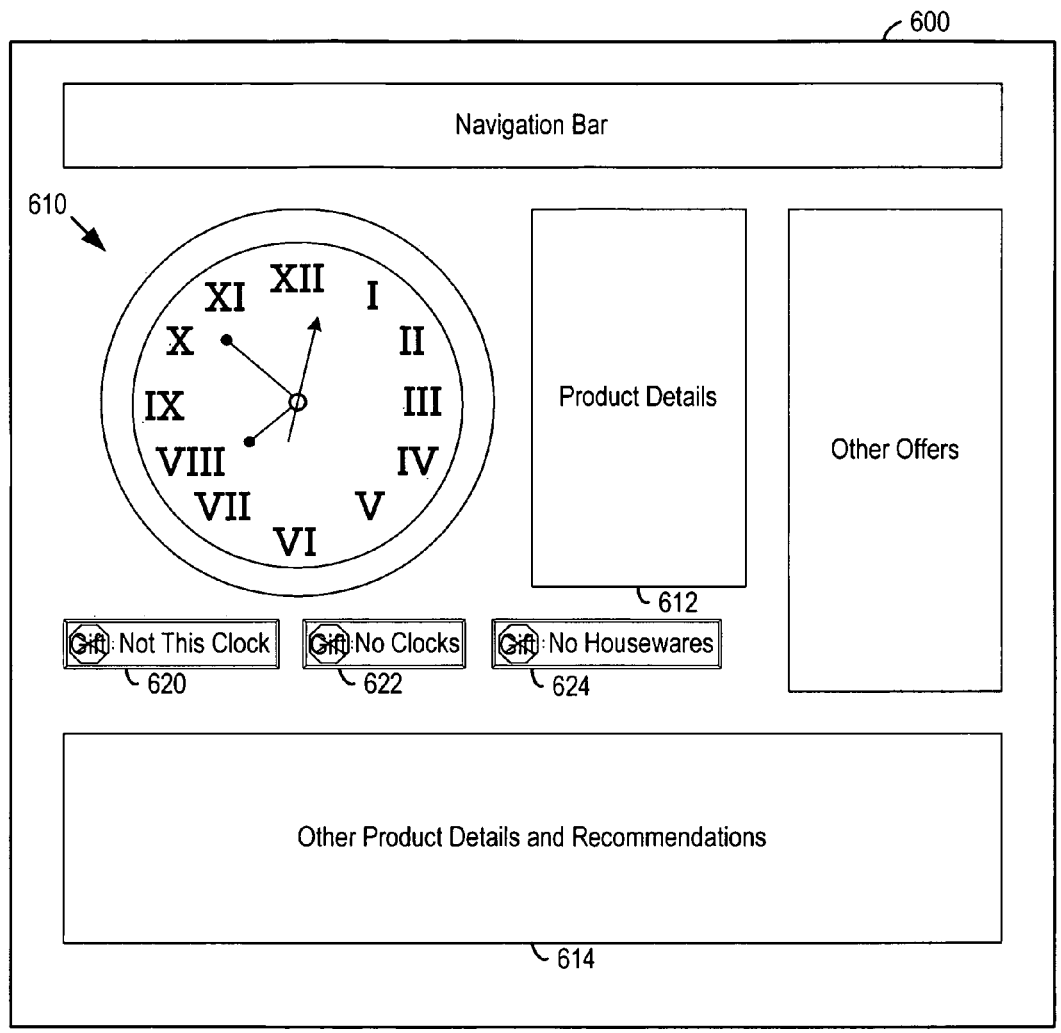
FIG. 6 is an exemplary graphical user interface that enables a user to configure rules for the gift conversion rules engine of FIG. 1 while browsing the merchant website.

Referring now to FIG. 6, an alternative graphical user interface for configuring gift conversion rules for rules engine 120 is shown. The graphical user interface in FIG. 6 permits a user to configure rules specifying that gift conversions should occur responsive to the gift being a particular product or being from within a particular product category. In the example of FIG. 6, however, such rules may be configured while the user is browsing product information on the merchant website, without having to visit a separate rule configuration user interface.

Thus, FIG. 6 shows a screen display 600 that may be presented to a user while the user is browsing the website provided by the website system 104. In the screen display 600, the user is provided with product detail information regarding a particular product that is offered for sale on the website. For example, the user may be provided with a picture of the product in field 610 (e.g., a picture of a clock offered for sale), with product detail information in field 612, and with other product details and recommendations in field 614. A plurality of buttons 620, 622, and 624 are also shown which may be displayed to the user and which the user may select to configure a gift conversion rule. For example, if the user selects button 620 (labeled "Not This Clock"), a rule may automatically be configured to trigger a gift conversion if a sender tries to send the particular clock shown in FIG. 6. Although the user interface for creating the rule is different, the rule that is created may operate in the same manner as a rule created using menu item 441 ("Specific product") in FIG. 4B. As additional examples, the user may instead select button 622 ("No Clocks") to specify a rule configured to trigger a gift conversion if a sender tries to send any clocks, or a button 624 ("No Housewares") to specify a rule configured to trigger a gift conversion if a sender tries to send any housewares. The rules created by selecting buttons 622 or 624 may operate in the same manner as a rule created using menu item 443 ("Product category") as discussed above in connection with FIG. 4B.

Figure 7:
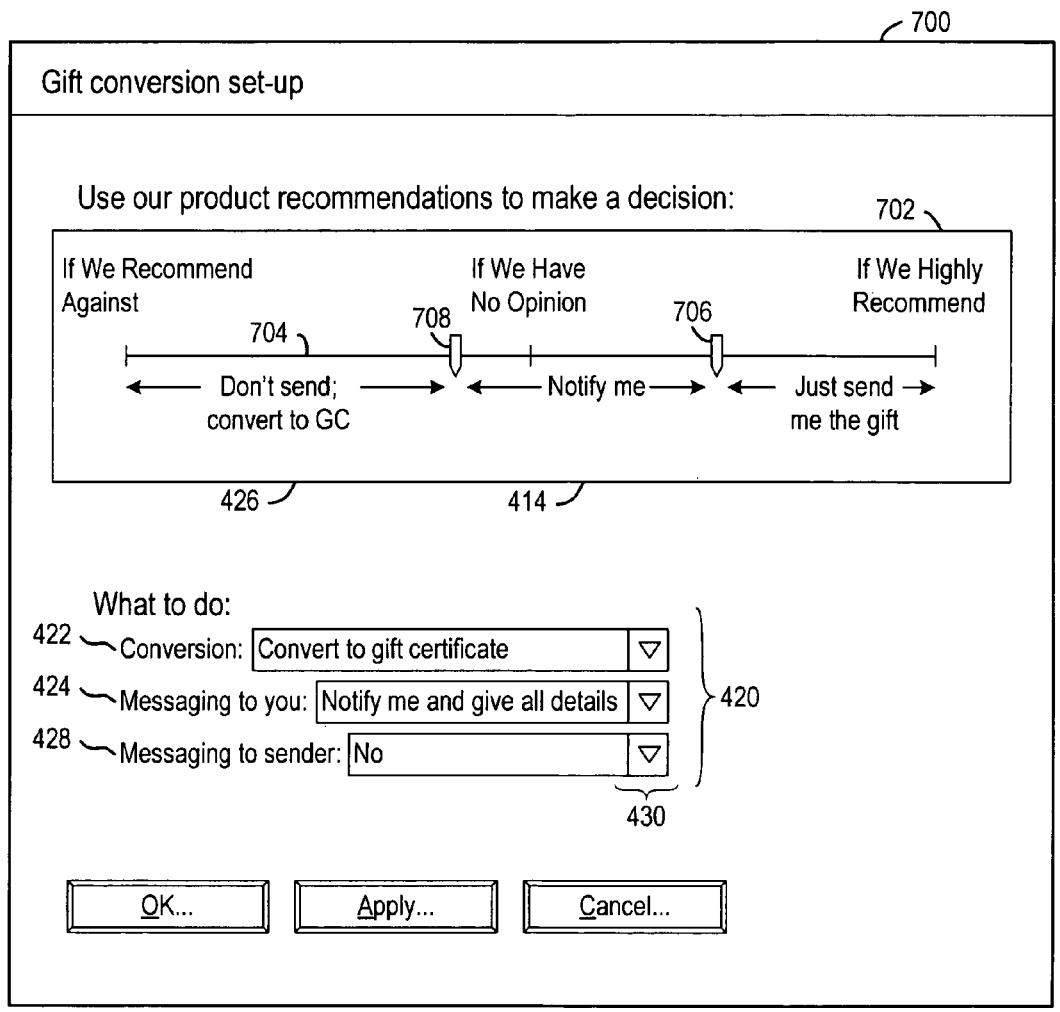
FIG. 7 is an exemplary graphical user interface that enables a user to configure rules for the gift conversion rules engine of FIG. 1 that rely on product recommendations made by the merchant website.

Referring now to FIG. 7, a screen display 700 for another alternative graphical user interface for configuring rules for rules engine 120 is shown. The user may, for example, be brought to the screen display 700 upon selecting the new rule button 310 in FIG. 3. In FIG. 7, the user is provided the ability to take advantage of product recommendation capabilities of the website system 104 to facilitate decisions in connection with fields 414 and 426, discussed above in connection with FIG. 4. Particularly, product recommendations related to the product selected as the gift may be used to facilitate decisions about whether a gift conversion should be triggered and to facilitate decisions about when the gift conversion should be performed.

In FIG. 7, the screen display 700 comprises a window 702 that includes a slider bar 704 and one or more sliders 706 and 708. The sliders 706 and 708 are configured to move along the slider bar 704 to reflect different threshold settings for the strengths of recommendations. For example, when a gift is selected for the user, the website system may evaluate the gift using product recommendation logic. The product recommendation logic may provide an indication of how strongly the website system 104 recommends the product selected as a gift for the user. As will be appreciated, the product recommendation logic may generate product recommendations based on past purchases of the user, based on past browsing activity of the user, based on past purchases made by users that are perceived to have similar interests as the user, based on past browsing activity of users that are perceived to have similar interests as the user, and so on. The product recommendation logic may also generate negative product recommendations (i.e., a recommendation against a product) based on information indicating that the user is not interested in certain products, such as information obtained using the graphical user interface shown in FIG. 6, based on information concerning prior gifts that have been converted by the user, based on other information indicating particular products or categories of products as items that the user does not wish to receive, and so on.

Thus, as shown in FIG. 7, a number of ranges may be defined using the sliders 706 and 708. For example, if the website system 104 recommends the gift for the user, and the strength of the recommendation is greater than the level set by slider 706, the gift is sent to the user without first checking with the user. On the other hand, if the website system 104 recommends against the gift for the user, and the strength of the recommendation against is greater than the level set by slider 708, the gift is converted to a gift certificate without notifying the user. Finally, if the recommendation is somewhere between slider 706 and 708, the user is notified, and the user provides a decision as to whether the gift should be converted to a gift certificate.

In an exemplary embodiment, to facilitate ease of use, the number of sliders and the designated actions to be taken with each recommendation range are provided as a default configuration. In another exemplary embodiment, the number of sliders and the designated actions to be taken are user configurable. For example, the user may be provided with the ability to click and drag additional sliders onto the slider bar 704. When each slider is created, additional fields (akin to field 426 in FIG. 4F) may be provided to permit the user to configure what should happen if the strength of the recommendation is above/below the threshold specified by the additional slider. As will be appreciated, other actions may also be taken, depending on what is specified in field 422 (shown again in FIG. 7). The settings corresponding to fields 422, 424, and 428 may be determined on a default basis for all products/categories, may be configured by the user for all products/categories, may be configured by the user on a case-by-case basis, or may be configured in another manner.

Figure 8:
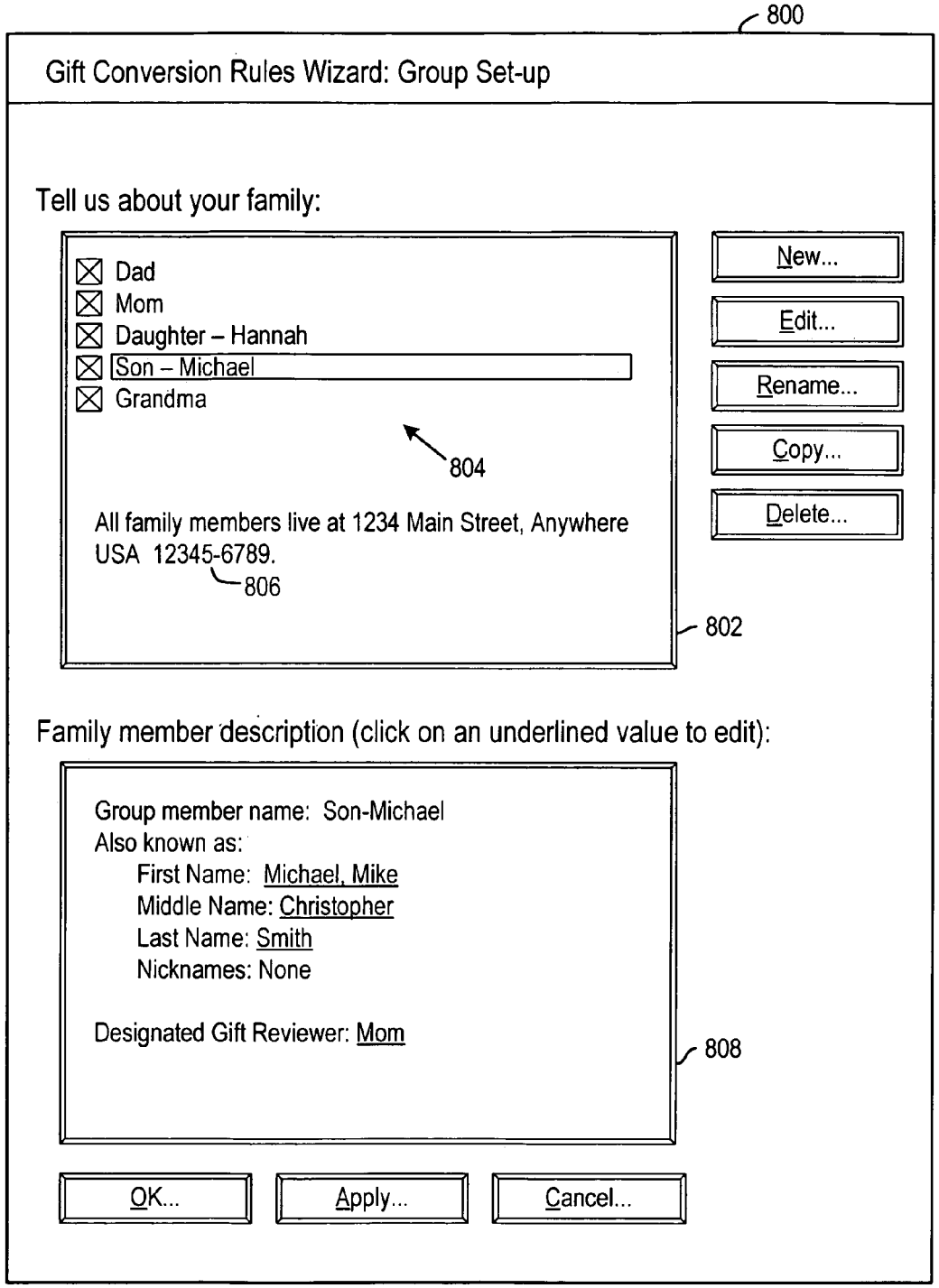
FIG. 8 is an exemplary graphical user interface that enables a user to configure rules for a group of potential recipients living at a common residence.

Referring now to FIG. 8, in an exemplary embodiment, rather than being configured for a single user, the rules engine 120 may be used to specify gift conversion rules for a group of users. For example, in the example shown in FIG. 8, gift conversion rules are specified for a family living at a particular residence. In window 802, the members of the family are listed. The address at which the family members are assumed to reside is identified in a text field 806. For each family member, various information can be edited as shown in window 808. In the example of FIG. 8, the gift reviewer for the son is shown to be "Mom." Thus, the arrangement of FIG. 8 allows parents to review gifts being sent to their children to ensure that the gifts are age-appropriate, to ensure that the child does not already own the gift, to ensure that the gift is the right size/style, and so on.

Figure 9:
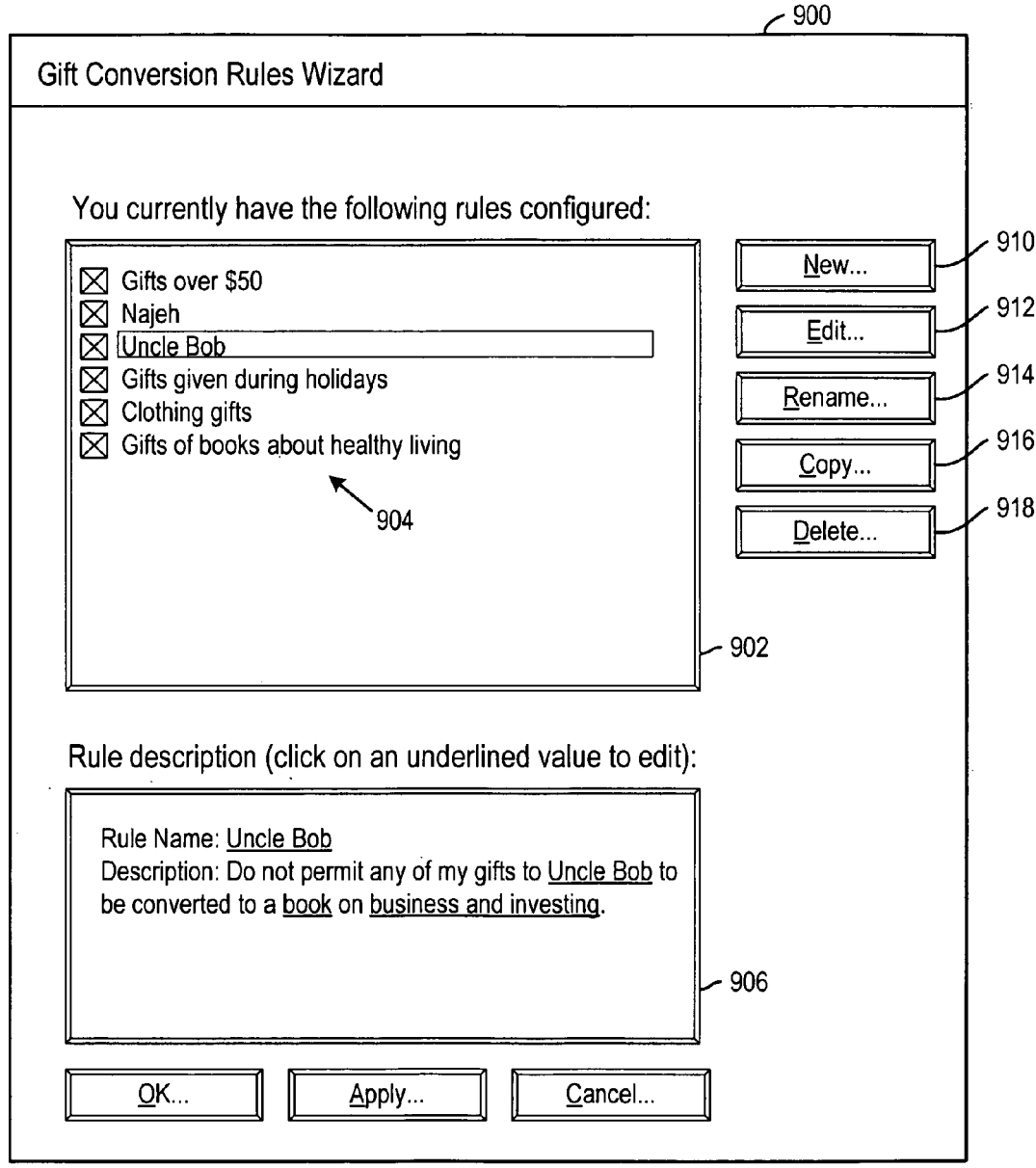
FIG. 9 is a graphical user interface that enables a user to configure sender rules for the gift conversion rules engine of FIG. 1.

Referring now to FIG. 9, in another exemplary embodiment, senders may also be provided with the ability to configure rules for the rules engine 120. FIG. 9 shows a top-level screen display 900 that may be provided to a user to configure and maintain rules in database 136 in FIG. 1. For example, the screen display 900 may be made accessible to users through an account settings area of the website system 104, and users that purchase gifts on the website may configure sender rules for the rules engine 120 by visiting the account settings area of the website system 104.

Sender rules may, for example, be configured in generally the same manner as described above for recipient rules. In FIG. 3, the user (i.e., a recipient) may be provided with the ability to configure gift conversion rules defining circumstances in which a gift conversion should be triggered. By contrast, in FIG. 9, for example, the user (i.e., a sender) may be provided with the ability to configure gift conversion rules defining the opposite (i.e., circumstances in which a gift conversion should not be permitted to occur). Accordingly, such rules define circumstances in which a gift sent to a recipient cannot be converted to an alternate form. Screen display 900 comprises a window 902 identifying rules 904 that the user currently has configured. Each rule 904 has been given a name by the user. The screen display 900 also comprises a window 906 which provides a description of a selected one of the rules 904. The screen display 900 also includes buttons 910-918 to add, edit, rename, copy, and delete rules, as discussed above in connection with buttons 310-318 in FIG. 3. The description of the selected rule in window 906 may also provide a direct mechanism for the user to update specific fields in the selected rule, as shown. Although not specifically shown, it will be appreciated that the user may be brought to screen displays generally the same as those shown in FIGS. 4 and 4A-4G in order to provide detailed information for configuring the sender rules (e.g., when the user selects the button 910). In the example of FIG. 9, the user has configured a rule which has been assigned the name "Uncle Bob." The "Uncle Bob" rule relates to a particular gift recipient ("Uncle Bob"), and prevents a gift conversion from occurring if the result of the gift conversion would be to convert a gift into a product having a specified feature (a book on business and investing).

Decisions as to whether a gift should be converted may be made depending on the joint outcome of the rules configured by the sender and the rules configured by the recipient. As will be appreciated, various priorities may be configured to address the situation in which there is a conflict between the sender rules and the recipient rules in the context of a particular gift. Such priorities may be system-specified and/or user configurable and may be specified on either a global basis or on a rule-by-rule basis (e.g., depending on the conditions specified in the rule). For example, as a default, a system-specified priority rule may dictate that any conflicts should be resolved in favor of the sender. However, the sender may specify that any conflicts should be resolved in favor of the recipient. In such an instance, the default rule is not used and the sender-specified rule is used instead, thereby causing any conflicts to be resolved in favor of the recipient. As will be appreciated, various other permutations and combinations of priorities may be configured for resolving conflicts between the sender rules and the recipient rules.

Users may also be provided with the ability to configure other types of sender rules. For example, users may be provided with the ability to configure a rule which causes a gift to be sent to a particular recipient every year on a specified date (e.g., on the recipient's birthday). The gift may, for example, be selected automatically from the wish list of the recipient based on pricing information, ranking information, or other information concerning the items in the wish list.

The invention is described above with reference to drawings. These drawings illustrate certain details of specific embodiments that implement the systems, methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Accordingly, the visitor computers 102 depicted in FIG. 1 may include, but are not limited to, desktop computers, laptop computers, set-top boxes, personal digital assistants, cellular telephones, media players, web pads, tablets, etc. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps. It should also be noted that the word "engine" as used herein and in the claims is intended to encompass implementations using one or more lines of software code, and/or hardware implementations, and/or equipment for receiving manual inputs. Components such as engines, interfaces, databases, browsers, and so on, may be in communication with each other either because such components are provided in integral fashion because they are in communication with each other through a communication link, such as a network, and/or for other reasons.

The foregoing description of embodiments of the invention have been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

What is claimed is:

1. A computer-implemented data processing system comprising:
a memory that stores gift conversion rules; and
a processor in communication with the memory that:
generates a user interface configured to permit a gift sender to order a product as a gift for a gift recipient via a network service; and
executes gift conversion logic that permits the gift recipient to specify the gift conversion rules, wherein the gift conversion rules specified by the gift recipient define a manner in which gifts purchased for the gift recipient may be automatically converted, wherein at least one gift conversion rule identifies the gift sender who has ordered a product as a gift for the gift recipient, such that whether the gift is converted is determined based at least in part on the identity of the gift sender specified in the at least one gift conversion rule.

2. A system as defined in claim 1, wherein at least one other gift conversion rule is based on a product, such that whether a gift is converted is determined based on the product selected as the gift.

3. A system as defined in claim 1, wherein at least one other gift conversion rule is based on a product category, such that whether a gift is converted is determined based on a product category of the product selected as the gift.

4. A system as defined in claim 1, wherein at least one other gift conversion rule is based on a product feature, such that whether a gift is converted is determined based on a product feature of the product selected as the gift.

5. A system as defined in claim 1, wherein at least one other gift conversion rule is based on monetary value, such that whether a gift is converted is determined based on the monetary value of the product selected as the gift.

6. A system as defined in claim 1, wherein at least one other gift conversion rule is based on aggregate monetary value, such that whether a gift is converted is determined based on the aggregate monetary value of a plurality of products selected as gifts.

7. A system as defined in claim 1, wherein at least one other gift conversion rule is based on quantity, such that whether a gift is converted is determined based on the quantity of products selected as gifts.

8. A system as defined in claim 1, wherein at least one other gift conversion rule is based on timing of the gift, such that whether a gift is converted is determined based on the timing of the gift.

9. A system as defined in claim 1, further comprising recommendation logic in communication with the gift conversion logic, the recommendation logic configured to generate a product recommendation for a gift for the gift recipient.

10. A system as defined in claim 9, wherein at least one other gift conversion rule is based on the strength of the product recommendation generated by the recommendation logic, such that whether a gift is converted is determined based on the strength of the product recommendation.

11. A system as defined in claim 1, wherein at least one other gift conversion rule defines a type of gift conversion.

12. A system as defined in claim 11, wherein the type of gift conversion is a conversion of a gift into a gift certificate.

13. A system as defined in claim 11, wherein the type of gift conversion is a conversion of a gift into a different gift.

14. A system as defined in claim 13, wherein the at least one gift conversion rule permits the different gift to be selected from a wish list of the gift recipient.

15. A system as defined in claim 14, wherein the at least one other gift conversion rule permits the different gift to be automatically selected from the wish list.

16. A system as defined in claim 15, wherein the at least one gift conversion rule permits the different gift to be automatically selected from the wish list based on a comparison of a monetary value of the gift with monetary values of different items on the wish list.

17. A system as defined in claim 16, wherein the different gift that is selected is the item on the wish list having a monetary value closest to the monetary value of the gift.

18. A system as defined in claim 17, wherein payment is obtained for a difference between the monetary value of the different gift and the monetary value of the gift.

19. A system as defined in claim 16, wherein the different gift that is selected is the item on the wish list having a monetary value closest to but not exceeding the monetary value of the gift.

20. A system as defined in claim 16, wherein at least one other gift conversion rule permits the different gift to be automatically selected from the wish list based on a comparison of when different items were added to the wish list.

21. A system as defined in claim 20, wherein the different gift that is selected is the most recently added item on the wish list.

22. A system as defined in claim 20, wherein the different gift that is selected is the item on the wish list that has been on the wish list the longest.

23. A system as defined in claim 15, wherein at least one other gift conversion rule permits the different gift to be automatically selected from the wish list based on a ranking of different items in the wish list.

24. A system as defined in claim 23, wherein the ranking is a ranking specified by the gift recipient.

25. A system as defined in claim 24, wherein the ranking is a ranking specified automatically based on past shopping activity of the gift recipient.

26. A system as defined in claim 11, wherein the type of gift conversion is a conversion of a gift into a gift for a third party.

27. A system as defined in claim 26, wherein the third party is a charity.

28. A system as defined in claim 1, wherein at least one other gift conversion rule defines a type of messaging to the gift recipient.

29. A system as defined in claim 28, wherein the type of messaging to the gift recipient is a notification to the gift recipient of a potential gift conversion that includes a link to a product detail page for the gift.

30. A system as defined in claim 28, wherein the type of messaging to the gift recipient is a notification to the gift recipient of a potential gift conversion that includes product information for the gift.

31. A system as defined in claim 28, wherein the type of messaging is a notification to a third party of a potential gift conversion.

32. A system as defined in claim 1, wherein at least one other gift conversion rule requires the gift recipient to approve a gift conversion.

33. A system as defined in claim 32, wherein the at least one gift conversion rule requires the gift recipient to explicitly approve the gift conversion.

34. A system as defined in claim 1, wherein at least one other gift conversion rule assumes that the gift recipient approves the gift conversion based on gift recipient inaction after receiving notification of the gift conversion.

35. A system as defined in claim 1, wherein at least one other gift conversion rule specifies that approval of the gift recipient need not be obtained.

36. A system as defined in claim 3, wherein the gift is apparel, and wherein converting the gift comprises converting the apparel from a first size to a second size.

37. A system as defined in claim 36, wherein the second size is specified by the gift recipient in one or more of the gift conversion rules.

38. A system as defined in claim 3, wherein the gift is a gift configured for use with a first hardware platform, and wherein converting the gift comprises converting the gift to a gift configured for use with a second hardware platform.

39. A system as defined in claim 38, wherein the second hardware platform is specified by the gift recipient in one or more of the gift conversion rules.

40. A system as defined in claim 3, wherein the gift is a gift having a first media format, and wherein converting the gift comprises converting the gift from the first media format to a second media format.

41. A system as defined in claim 40, wherein the second media format is specified by the gift recipient in one or more of the gift conversion rules.

42. A system as defined in claim 3, wherein the gift is a gift configured for use with devices having a first operating system, and wherein converting the gift comprises converting the gift to a gift configured for use with devices having a second operating system.

43. A system as defined in claim 42, wherein the second operating system is specified by the gift recipient in the gift conversion rules.

44. In a non-transitory computer readable medium associated with a computing system, a graphical user interface generated on the computing system by the contents of the non-transitory computer readable medium, the graphical user interface comprising:

a plurality of displays caused to be displayed by the computing system that receive information from a gift recipient to configure gift conversion rules, the gift, conversion rules defining a manner in which a gift selected for the recipient by a gift sender using a network commerce service may be automatically converted, wherein at least one of the gift conversion rules identifies potential gift senders, such that whether a gift selected by a gift sender for the gift recipient using a network commerce service is automatically converted is determined based at least in part on whether the gift sender is one of the potential gift senders identified in the at least one gift conversion rule.

45. A graphical user interface as defined in claim 44, wherein the plurality of displays include one or more displays that provide a set of rules configured by the gift recipient.

46. A graphical user interface as defined in claim 44, wherein the plurality of displays include one or more displays that include: (i) product information for a product available to be ordered through the network commerce service, and (ii) a user-selectable option permitting the gift recipient to configure a rule relating to the product by selecting the option.

47. A graphical user interface as defined in claim 46, wherein the user-selectable option is displayed separately from the product information.

48. A graphical user interface as defined in claim 46, wherein the one or more displays include multiple user-selectable options permitting the gift recipient to configure different types of rules relating to the product by selecting different ones of the options.

49. A graphical user interface as defined in claim 44, wherein the plurality of displays include one or more displays that permit the gift recipient to configure one or more other gift conversion rules by product category, such that whether a gift is converted is determined based on a product category of the product selected as the gift.

50. A graphical user interface as defined in claim 44, wherein the plurality of displays include one or more displays that permit the gift recipient to configure one or more other gift conversion rules based on a strength of a product recommendation, such that whether a gift is converted is determined based on the strength of the product recommendation.

51. A graphical user interface as defined in claim 44, wherein the plurality of displays include one or more displays that permit the gift recipient to configure one or more other gift conversion rules based on a product, such that whether a gift is converted is determined based on the product selected as the gift.

52. A graphical user interface as defined in claim 44, wherein the plurality of displays include one or more displays that permit the gift recipient to configure one or more other gift conversion rules based on monetary value, such that whether a gift is converted is determined based on the monetary value of the product selected as the gift.

53. A graphical user interface as defined in claim 44, wherein the plurality of displays include one or more displays that permit the gift recipient to configure one or more other gift conversion rules based on aggregate monetary value, such that whether a gift is converted is determined based on the aggregate monetary value of a plurality of products selected as gifts.

54. A graphical user interface as defined in claim 44, wherein the plurality of displays include one or more displays that permit the gift recipient to configure one or more other gift conversion rules based on quantity, such that whether a gift is converted is determined based on the quantity of products selected as gifts.

55. A graphical user interface as defined in claim 44, wherein the plurality of displays include one or more displays that permit the gift recipient to configure one or more other gift conversion rules based on timing of the gift, such that whether a gift is converted is determined based on the timing of the gift.

56. A computer-implemented method comprising:
under control of one or more configured computer systems,
receiving a gift purchase from a gift sender, the gift sender being a user of a network commerce service, the gift purchase being a purchase of a gift for a gift recipient;
accessing gift conversion rules, the gift conversion rules having been configured for the gift recipient, at least one of the gift conversion rules identifying potential gift senders; and
determining that the gift should be automatically converted when the gift sender from whom the gift purchase is received is one of the potential gift senders identified in the at least one gift conversion rule.

57. A method as defined in claim 56, further comprising generating a recommendation for the gift, the recommendation being generated based on at least one of past purchases of the gift recipient, past browsing activity of the gift recipient, past purchases made by users that are perceived to have similar interests as the gift recipient, and past browsing activity of users that are perceived to have similar interests as the gift recipient.

58. A method as defined in claim 57, wherein whether the gift should be converted is determined based on the recommendation.

59. A method as defined in claim 56, further comprising converting the gift into a different gift, the different gift being automatically selected from a wish list of the gift recipient.

60. A method as defined in claim 59, wherein the different gift is selected from the wish list based on a comparison of a monetary value of the gift with monetary values of different items on the wish list.

61. A method as defined in claim 59, wherein the different gift is selected from the wish list based on a comparison of when different items were added to the wish list.

62. A method as defined in claim 56, further comprising determining that approval of the gift recipient is not required to perform the gift conversion, and wherein whether approval of the gift recipient is required is configurable by the gift recipient in at least one gift conversion rule.

63. A method as defined in claim 56, further comprising converting the gift into a gift for a third party.

64. A method as defined in claim 56, wherein the gift conversion rules are configured for a group of users, the group of users including the recipient.

65. A method as defined in claim 64, wherein the group of users live at a common residence.

66. A method as defined in claim 56, wherein the gift is a product.

67. A method as defined in claim 66, wherein the product is a good.

68. A method as defined in claim 66, wherein the product is a service.

69. A method as defined in claim 66, wherein the product is a subscription.

70. A method as defined in claim 56, wherein the gift conversion rules include at least one other rule that causes gifts to the gift recipient to be converted regardless of a product purchased as the gift, and regardless of timing of the gift.

71. A method as defined in claim 56, wherein the gift conversion rules are recipient gift conversion rules, and wherein the method further comprises accessing sender gift conversion rules.

72. A method as defined in claim 71, wherein the sender gift conversion rules specify circumstances in which a gift conversion should not be permitted to occur, and wherein determining whether the gift should be converted is performed based on a joint outcome of the recipient gift conversion rules and the sender gift conversion rules.

\* \* \* \* \*